Feb. 8, 1927.
O. E. HUNT
DIFFERENTIAL MECHANISM
Filed Aug. 11, 1922
1,616,627
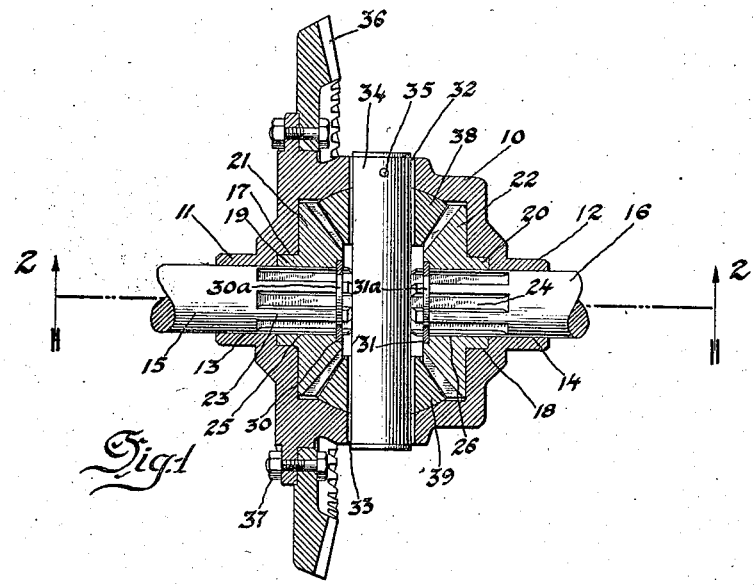
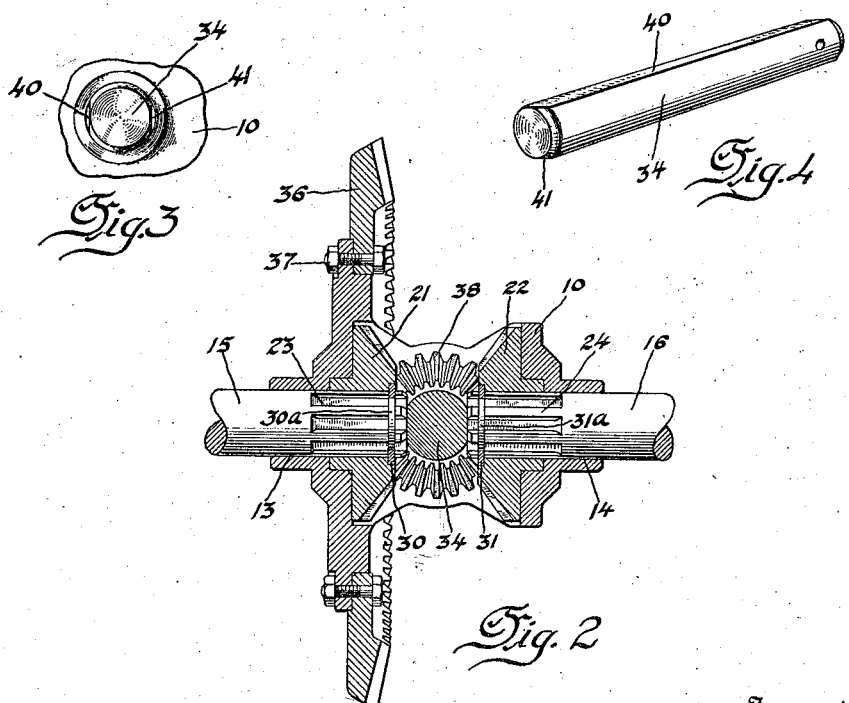
Inventor
Ormond E. Hunt
By his Attorneys
Blackmore Spencer & Hunt Patented Feb. 8, 1927.

1,616,627

UNITED STATES PATENT OFFICE.

ORMOND E. HUNT, OF DETROIT, MICHIGAN, ASSIGNOR TO GENERAL MOTORS CORPORATION, OF DETROIT, MICHIGAN, A CORPORATION OF DELAWARE.

DIFFERENTIAL MECHANISM.

Application filed August 11, 1922. Serial No. 581,165.

This invention relates to automobiles and more particularly to the differential mechanism thereof.

One of the objects of the invention is the provision of a new and improved differential assembly that is substantial in construction, cheap to manufacture, easily assembled, composed of few parts, and that is not likely to get out of order.

Another object of the invention is the elimination of the spacer block and at the same time provide efficient means for lubricating the moving parts.

Other and further objects and advantages of the invention will appear from the description taken in connection with the accompanying drawings in which Figure 1 is a section of a differential mechanism, parts broken away.

Figure 2 is a section on line 2—2 of Figure 1.

Figure 3 is a plan view of a detail with parts broken away; and,

Figure 4 is a perspective view of the combined spacer and differential pinion shaft or bearing.

On the drawing the reference character 10 designates a differential support which may be an integral yoke and is preferably of the two pinion type. It may, however, be of a different type and comprise a plurality of sections secured together in the usual manner. The support 10 is provided with laterally extending hubs 11 and 12 which are adapted to engage bearings in the differential housing as is usual in such constructions. The hubs 11 and 12 are provided with alined openings 13 and 14 into which the axle sections 15 and 16 are adapted to extend.

The openings 13 and 14 are provided at their inner ends with counterbores 17 and 18 in which are journaled the laterally extending hubs 19 and 20 of side gears 21 and 22. The side gears 21 and 22 are slidably secured to the axle sections 15 and 16, respectively, in any suitable manner as by providing splined projections 23 and 24 on the inner ends of the axle sections 15 and 16 which are adapted to engage corresponding recesses formed in the inner periphery of the openings 25 and 26 in the gears 21 and 22. Suitable means are provided for preventing the withdrawal of the axle sections from the side gears such as the C-shaped retaining spring washers 30 and 31 which are adapted to engage grooves 30$^a$ and 31$^a$ about the inner ends of the said axle sections. These washers may, if desired, be seated in counterbores formed in the inner ends of the side gears.

The yoke 10 is provided with alined circular openings 32 and 33 arranged at right angles to the axle sections 15 and 16. A shaft 34 is adapted to extend through said openings and to be secured therein by any suitable means such as the pin 35. This shaft is adapted to constitute a bearing on which the differential pinions 38 and 39 are rotatably mounted. The differential pinions 38 and 39 are adapted to mesh with the side gears for rotating the axles 15 and 16 and permitting a differential movement thereof, as is usual in such constructions. The yoke 10 is also provided with the usual ring gear 36 which may be secured thereto in any convenient manner as by means of the bolts 37.

It is common practice in the manufacture of differential mechanism to employ a spacer in the differential support for preventing or limiting inward movement of the axle sections. The present construction eliminates the spacer element by forming the shaft 34 so that it will afford bearings for the differential pinions 38 and 39 and at the same time perform the function of a spacer block. In order to accomplish this and at the same time avoid a line contact between the inner ends of the axle sections and the shaft 34, the latter is provided with flat or plane parallel surfaces 40 and 41 against which said axle sections may abut. The distance between the parallel faces is such that the shaft when inserted between the inner ends of the axle sections, will constitute a spacer block to prevent inward movement of either axle section.

The flat portions or plane faces 40 and 41 may extend the full length of the shaft, whereby when said shaft is secured in position in the circular openings 32 and 33 the flattened portions of said shaft will form with the walls of said openings, conduits, passages or spaces through which oil may pass for lubricating the differential pinions and other parts of the differential mechanism.

When it is desired to withdraw the axle sections the shaft 34 is removed whereby said sections may be moved inwardly and the retaining washers removed, after which the axle sections may be withdrawn.

It will be understood that various changes in the form, construction, composition and arrangement of the several parts may be resorted to without departing from the spirit and scope of my invention; hence I do not wish to limit myself strictly to the structure herein set forth, but

What I claim is:—

1. A differential comprising, in combination, a differential support carrying a ring gear, side gears having laterally-extending hubs journaled in opposite sides of the support, axle sections splined in the hubs of the side gears, a shaft fixedly secured in the support at right angles to the axle sections and extending between the side gears, differential pinions supported at diametrically opposite points by and between said side gears, said shaft being formed throughout its length with flat faces next said side gears and supporting said pinions.

2. A differential comprising, in combination, a differential support carrying a ring gear, side gears carried within said support, axle sections splined in the hubs of said side gears, differential pinions between said side gears at diametrically opposite points, a shaft formed throughout its length with flat opposing faces, said device constructed and arranged to receive said shaft through openings in said support and pinions whereby the inner ends of said axle sections engage the flat faces on said shaft, and means for securing said shaft within the support.

In testimony whereof I affix my signature.

ORMOND E. HUNT.